(12) United States Patent
Takasaki et al.

(10) Patent No.: US 6,654,323 B2
(45) Date of Patent: Nov. 25, 2003

(54) METHOD OF TRACKING SERVO FOR OPTICAL PICKUP DEVICE

(75) Inventors: Koji Takasaki, Chiba (JP); Hitoshi Okada, Chiba (JP); Tsutomu Maruyama, Chiba (JP)

(73) Assignee: Sony Corporation (JP)

( * ) Notice: Subject to any disclaimer, the term of this patent is extended or adjusted under 35 U.S.C. 154(b) by 251 days.

(21) Appl. No.: 09/837,224

(22) Filed: Apr. 19, 2001

(65) Prior Publication Data

US 2002/0006092 A1 Jan. 17, 2002

(30) Foreign Application Priority Data

Apr. 20, 2000 (JP) ...................................... P2000-119959

(51) Int. Cl.⁷ ................................................. G11B 7/00
(52) U.S. Cl. ................................ 369/44.41; 369/44.27; 369/44.37
(58) Field of Search ............................... 369/47.1, 47.5, 369/44.11, 44.12, 44.27, 44.28, 44.34, 44.37, 44.41

(56) References Cited

U.S. PATENT DOCUMENTS 5,168,487 A * 12/1992 Ohsato et al. ........... 369/44.37
6,246,660 B1 * 6/2001 Yanagawa ................... 369/116

* cited by examiner

*Primary Examiner*—Muhammad Edun
(74) *Attorney, Agent, or Firm*—Rader, Fishman & Grauer PLLC; Ronald P. Kananen

(57) ABSTRACT

A method of tracking servo for an optical pickup device comprises the steps of generating each individual push pull signal (an SPP1 signal, an SPP2 signal and an MPP signal) with a photo detector composed of a main photo detector having four photo-detecting sections crosswise and two side photo detectors having respectively two photo-detecting sections left and right, and generating a tracking error signal (a DPP signal) on the basis of operational output from the push pull signals resulting from respectively canceling the amounts of DC offset produced in each of the push pull.

8 Claims, 12 Drawing Sheets

F I G. 11
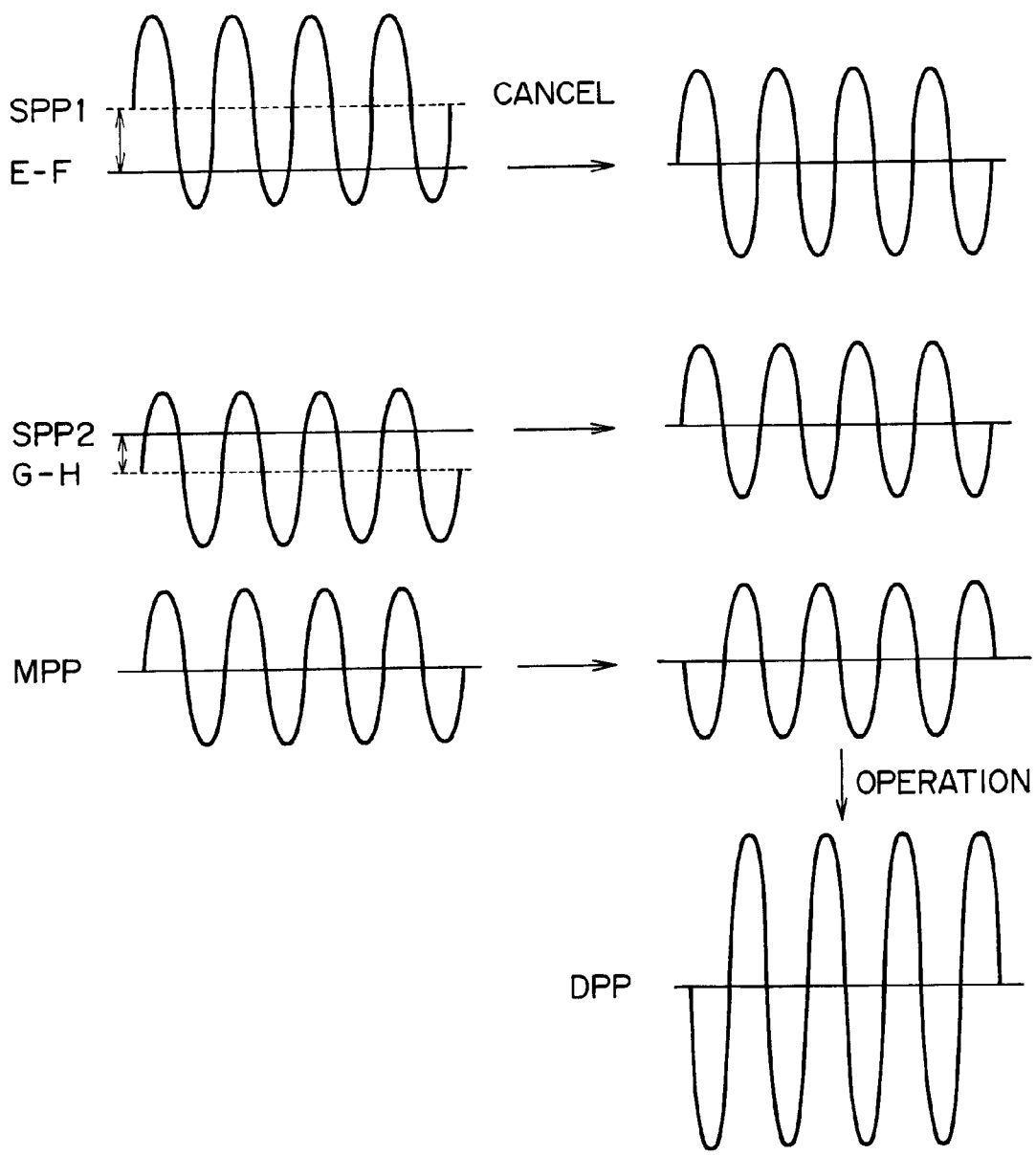

METHOD OF TRACKING SERVO FOR OPTICAL PICKUP DEVICE

BACKGROUND OF THE INVENTION

1. Field of the Invention

This invention relates to a novel method of tracking servo for an optical pickup device, and more specifically, to a technique which permits highly accurate tracking servo particularly in recording in an optical pickup device for use in a disk drive of a recordable optical disc as well.

2. Description of the Related Art

DPP (Differential Push Pull) method is well known as a method of tracking servo in a disk drive of an optical recording medium such as CD (Compact Disc), for instance.

The DPP method is a method of generating a tracking error signal through an operation of signals respectively outputted from photo detectors on the basis of a main beam MB and two side beams SB, SB.

Specifically, the DPP is by forming three spots respectively based on three beams, i.e., 0th-order diffraction light (a main beam) and ±1-st order diffraction light (side beams) on an optical disc with a diffraction means (a grating) arranged in a going path of a beam emitted from a laser light source, and then receiving returned light of the above three beams with photo detectors a, b, b respectively for applying a main spot MS based on the main beam to writing or reading of signals, while applying side spots SS, SS based on the side beams to tracking error detection.

As shown in FIG. 1, for instance, the main photo detector "a" for detecting the main spot MS is split into four sections crosswise, while each of the side photo detectors "b", "b" for detecting the side spots SS, SS is split into two sections left and right. Incidentally, output signals from the respective split elements are denoted as A, B, C, D, E, F, G and H. Then, a tracking error signal is generated on the basis of operational output among the output signals from these photo detectors "a", "b", "b".

That is, a DPP (Differential Push Pull) signal is obtained according to the following operation expression on the basis of an MPP (Main Push Pull) signal generated from the output signal of the main photo detector "a" and SPP1 and SPP2 (Side Push Pull) signals generated from the output signals of the side photo detectors "b", "b".

$MPP=(B+C)-(A+D)$ $SPP1=E-F$ $SPP2=G-H$ $DPP=MPP-K \cdot (SPP1+SPP2)$ $\therefore DPP=((B+C)-(A+D))-K \cdot ((E-F)+(G-H))$ K: Coefficient FIG. 1 shows schematically the relation between the photo detectors "a", "b", "b" and the spots MS, SS, SS when optical components or the like are free from variations, and FIG. 2 shows waveforms of the SPP1 signal, the SPP2 signal, the MPP signal and the DPP signal in FIG. 1.

As is apparent from FIG. 2, the SPP1 signal and the SPP2 signal are outputted in the same phase, the MPP signal is outputted in the reverse phase to the SPP1 signal and the SPP2 signal, and the DPP signal is outputted in the same phase as the MPP signal.

FIG. 3 schematically shows the positional relation between the photo detectors "a", "b", "b" and the spots MS, SS, SS when spaces among the spots MS, SS, SS are different due to variations or the like in optical components (the widened spaces among the spots are shown in FIG. 3). FIG. 4 shows the waveforms of the SPP1 signal, the SPP2 signal, the MPP signal and the DPP signal in FIG. 3. Incidentally, the waveform shown by a solid line in FIG. 4 is of each PP (Push Pull) signal in signal reading, while the waveform shown by a broken line is of the SPP signal and the DPP signal in signal writing which will be described later.

In signal reading, although positive DC offset and negative DC offset are respectively produced in the SPP1 signal and the SPP2 signal, both the amounts of DC offset are of the same absolute value. Thus, these amounts of DC offset may be canceled according to the above operation expression to permit the DPP signal to be outputted in a DC offset free state, resulting in maintenance of an on-track state (Refer to a solid line in FIG. 4).

FIG. 5 schematically shows the positional relation between the photo detectors "a", "b", "b" and the spots MS, SS, SS when the spots MS, SS, SS are one-sidedly (rightward in FIG. 5) shifted on the photo detectors "a", "b", "b" due to the positional difference of the objective and the photo detector or the like. FIG. 6 shows the waveform of the SPP1 signal, the SPP2 signal, the MPP signal and the DPP signal in FIG. 5. Incidentally, the waveform shown by a solid line in FIG. 6 is of each PP (Push Pull) signal in signal reading, while the waveform shown by a broken line is of each PP (Push Pull) signal in signal writing which will be described later.

In signal reading, although DC offset is produced in any of the SPP1 signal, the SPP2 signal and the MPP signal, these amounts of DC offset may be canceled according to the above operation expression to permit the DPP signal to be outputted in the DC offset free state, resulting in maintenance of the on-track state As described the above, the DPP method is considered to be an extremely effective method of tracking servo for an optical pickup of a signal reading system, for the reason that the amount of DC offset of the tracking error signal (the DPP signal) may be canceled according to the above operation expression, even in any of the case where the spaces among the spots MS, SS, SS are different due to the variations or the like in optical components as shown in FIG. 3, and the case where the spots MS, SS, SS are one-sidedly shifted on the photo detectors "a", "b", "b" due to the positional difference of the objective lens and the photo detector or the like as shown in FIG. 5.

However, it is to be understood that only the case of reading the signals of the optical disc as described above permits the amounts of offset produced to be canceled, when the spaces among the spots MS, SS, SS are different due to the variations or the like in optical components as shown in FIG. 3 or when the spots MS, SS, SS are one-sided on the photo detectors a, b, b due to the positional difference of the objective and the photo detector or the like as shown in FIG. 5.

FIG. 7 schematically shows the positional relation between the main beam MB and the side beams SB1, SB2 and recording tracks T in writing the signals onto an optical disc C.

In writing signals onto the optical disc C, one side beam SB1 (the side beam preceding the main beam MB) is reflected from a disc surface placed in a non-written state that pits "d", "d", are not formed yet at all, while the other side beam SB2 (the side beam following the main beam MB) is reflected from the disc surface between tracks T, T placed in the written state that the pits "d", "d", . . . are already formed. Thus, there is a problem in that a method similar to that of canceling the offset produced in reading the signals is not good enough to cancel the offset produced in writing the signals onto the optical disc.

That is, in writing the signals when the spaces among the spots MS, SS, SS are different due to the variations or the like in optical components to produce the offset, a disk drive of an optical recording medium, for example, an optical disc such as CD-R (Compact Disc-Recordable) and CD-RW (Compact Disc-Rewritable) or like optical disc causes the amount of DC offset 1 of the SPP1 signal to be different from the amount of DC offset 2 of the SPP2 signal, as shown by the broken line in the waveform diagram of FIG. 4. Specifically, the SPP2 signal produces the amount of offset 2 less in absolute value than the amount of offset 1 produced in the SPP1 signal, and as a result, the amount of DC offset 3, which may not be canceled by the above operation expression, is produced in the DPP signal provided as a final output signal.

On the other hand, in writing the signals when the spots MS, SS, SS are one-sidedly shifted on the photo detectors "a", "b", "b" due Lo the positional difference of the objective lens and the photo detector or the like to produce the offset, the disk drive of the optical disc such as CD-R and CD-RW causes the amount of DC offset 1' of the SPP1 signal to be different from the amount of DC offset 2' of the SPP2 signal as shown by the broken line in the waveform diagram of FIG. 6. Specifically, the SPP2 signal produces the amount of offset 2' less than the amount of offset 1' produced in the SPP1 signal to lower the DC level, and as a result, the amount of DC offset 3', which may not be canceled by the above operation expression, is produced in the DPP signal provided as the final output signal.

As described above, the disk drive in writing raises the problems in that the application of tracking servo produces a difference by a DC offset portion of the DPP signal to bring detracking (out-of-track), resulting in deterioration of writing performance.

In order to bring the above amounts of offset within the allowable limits in the optical pickup device, there is a need for higher accuracy of optical components themselves and the photo detector itself, together with higher accuracy of installation of these components, resulting in an increase in device cost. Further, the narrower allowable limits are required for the above amounts of DC offset Lo meet a demand for higher recording density, and in consequence, the optical pickup device presents a problem in difficulty in meeting a demand for higher recording density.

SUMMARY OF THE INVENTION

It is an object of the present invention to permit highly accurate tracking servo particularly in writing, simultaneously with attainment of higher recording density.

To achieve the above object, a method of tracking servo for an optical pickup device according to the present invention comprises the steps of generating each individual push pull signal with a photo detector composed of a main photo detector having four light receiving sections crosswise and two side photo detectors respectively having two light receiving sections left and right, and then generating a tracking error signal on the basis of operational output of the push pull signals resulting from canceling the amounts of DC offset produced in the push pull signals in the respective photo detectors for each push pull signal.

Accordingly, the method of tracking servo for the optical pickup device according to the present invention permits the amounts of DC offset produced in the push pull signals in the respective photo detectors to be canceled for each push pull signal. Thus, even if the SPP1 signal and the SPP2 signal are different in amount of DC offset, the DPP signal obtained finally from the above signals may be prevented from producing the offset, permitting highly accurate tracking servo simultaneously with attainment of higher recording density.

As has been described in the foregoing, in the method of tracking servo for the optical pickup device which uses the diffraction means to divide the beam emitted from the laser light source into one main beam and two side beams and allows the main photo detector to receive the main beam for reading or writing of the signals and servo error detection, while allowing the individual side photo detectors to receive two side beams for tracking error detection, the method of tracking servo for the optical pickup device according to the present invention comprises the steps of generating the individual push pull signal with the photo detector composed of the main photo detector having four photo-detecting sections crosswise and two side photo detectors having respectively two photo-detecting sections left and right, and then generating the tracking error signal on the basis of the operational output from the push pull signals resulting from canceling the amounts of DC offset produced in the push pull signals in the respective photo detectors every push pull signal.

Thus, the method of tracking servo for the optical pickup device according to the present invention permits the amounts of DC offset produced in the push pull signals in the respective photo detectors to be canceled for each push pull signal. Thus, even though the SPP1 signal and the SPP2 signal are different in amount of DC offset, the DPP signal may be prevented from producing the offset without the need for the operation expression, permitting highly accurate tracking servo simultaneously with attainment of higher recording density.

BRIEF DESCRIPTION OF THE DRAWINGS

The foregoing and other objects and features of the invention will become apparent from the following description of preferred embodiments of the invention with reference to the accompanying drawings, in which:

FIG. 11 illustrates waveforms of respective PP signal when spaces among the spots are different, together with waveforms of respective PP signal when the amount of DC offset of each PP signal is canceled.

DETAILED DESCRIPTION OF PREFERRED EMBODIMENTS

Now, an embodiment of a method of tracking servo for an optical pickup device according to the present invention will be described with reference to the accompanying drawings.

Figure 8:
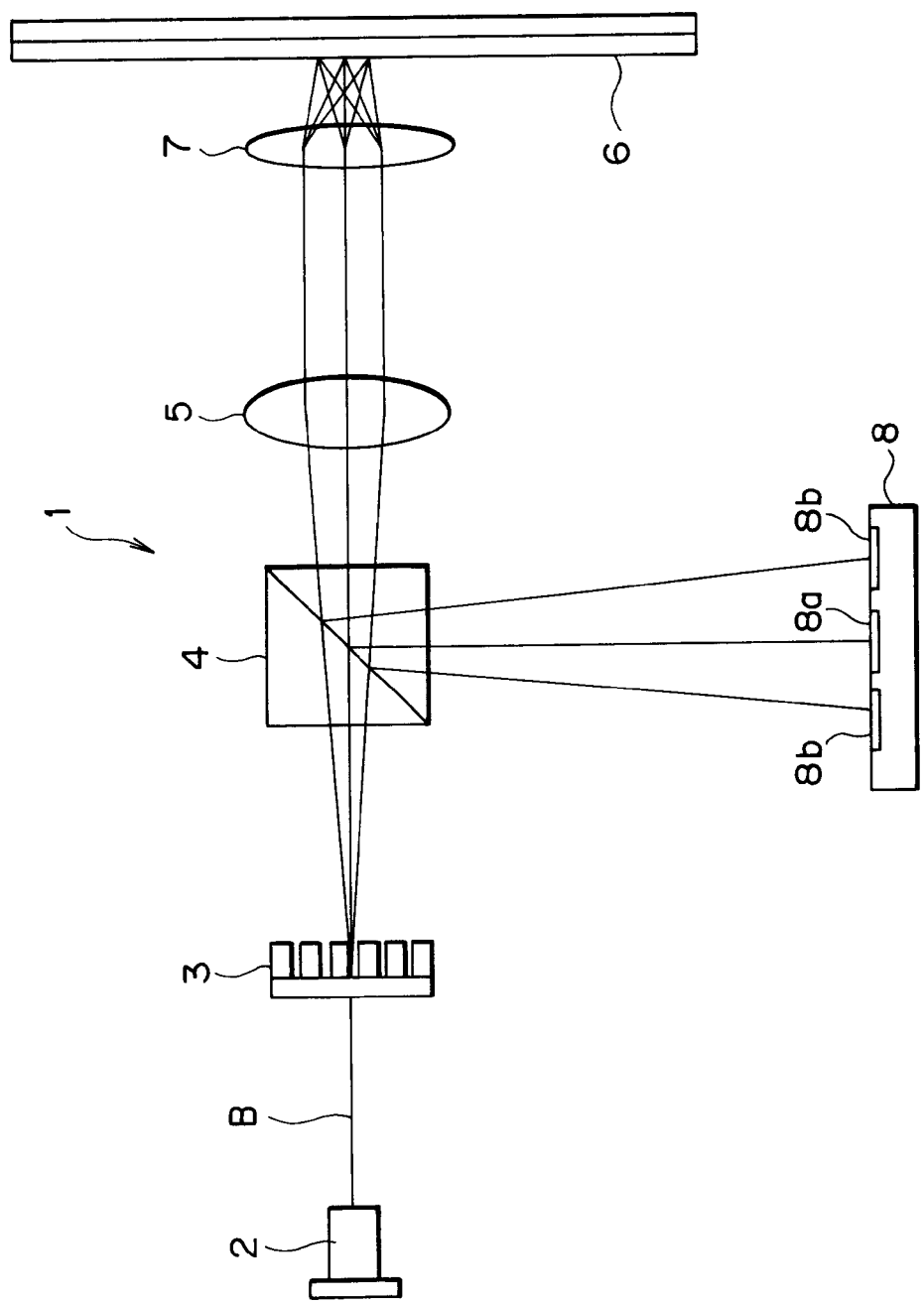
FIG. 8 is a side view schematically showing the overall configuration of one embodiment of an optical pickup device according to the present invention together with FIGS. 9 to 12.

FIG. 8 is a schematic view illustrating the configuration of optical components of an optical pickup device 1 according to the present invention.

The optical pickup device 1 comprises a laser light source 2 for generating a beam B, a diffraction means 3 for diffracting the beam B emitted from the laser light source 2, a beam splitter 4 for allowing the beam B to transmit or reflect in a predetermined direction, a collimator lens 5 for forming parallel luminous flux, an objective lens 7 for focusing the beam B on a signal surface of an optical disc 6 and a photo detector 8 for receiving the light returned from the optical disc 6.

Figure 9:
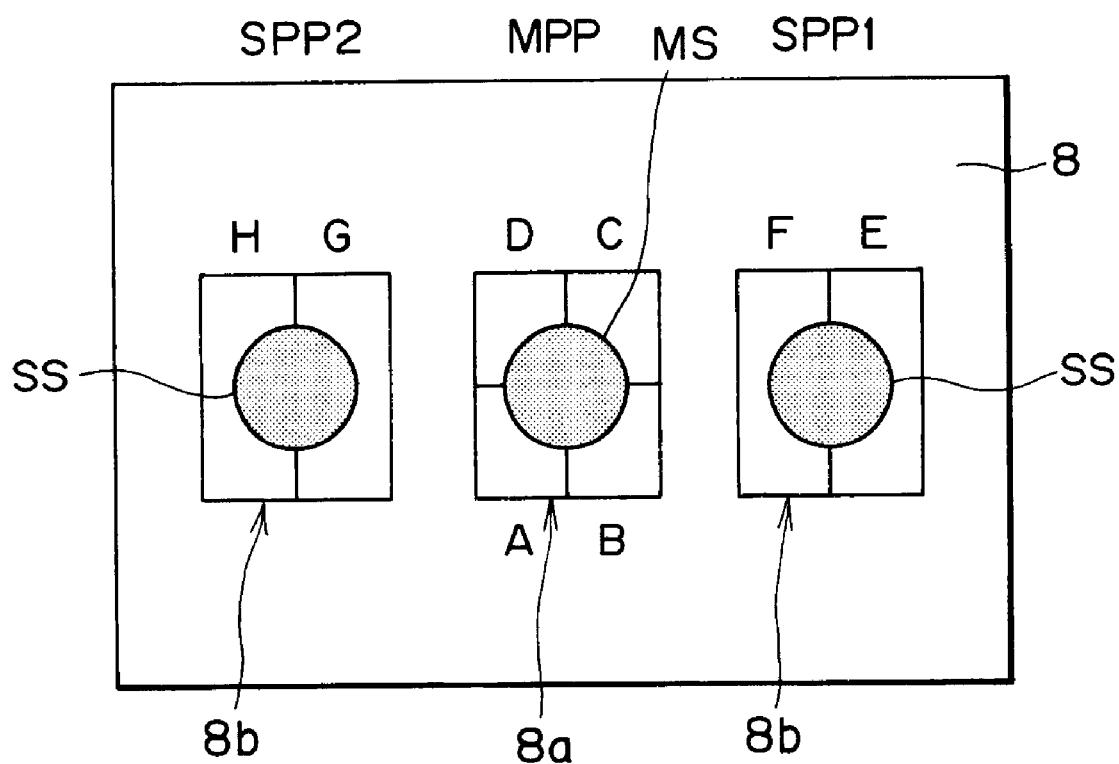
FIG. 9 is a view schematically showing the relation between the photo detectors and the spots.

As shown in FIG. 9, the photo detector 8 is composed of a main photo detector 8a and two side photo detectors 8b, 8b similarly to those described in the conventional art. The main photo detector 8a is split into four sections crosswise for receiving a main spot MS, while the side photo detectors 8b, 8b are respectively split into two sections right and left for receiving side spots SS, SS. Further, output signals from the respective split elements are denoted as A, B, C, D, E, F, G and H similarly to the conventional art. Then, operational output among output signals from these photo detectors 8a, 8b, 8b is adapted to generate a tracking error signal.

When the spaces among the spots MS, SS, SS on the photo detector are different due to the variations in optical components as described the above, or when the spots MS, SS, SS are one-sidedly shifted on the photo detector 8 due to the positional difference of the objective lens 7 and the photo detector 8 or the like, the amount of DC offset produced in an SPP1 signal differs from the amount of DC offset produced in an SPP2 signal in writing the signals. In this case, since the operation expression is not good enough to cancel such the different amounts of DC offset, a DPP signal produces DC offset, resulting in a problem of detracking.

Figure 10:
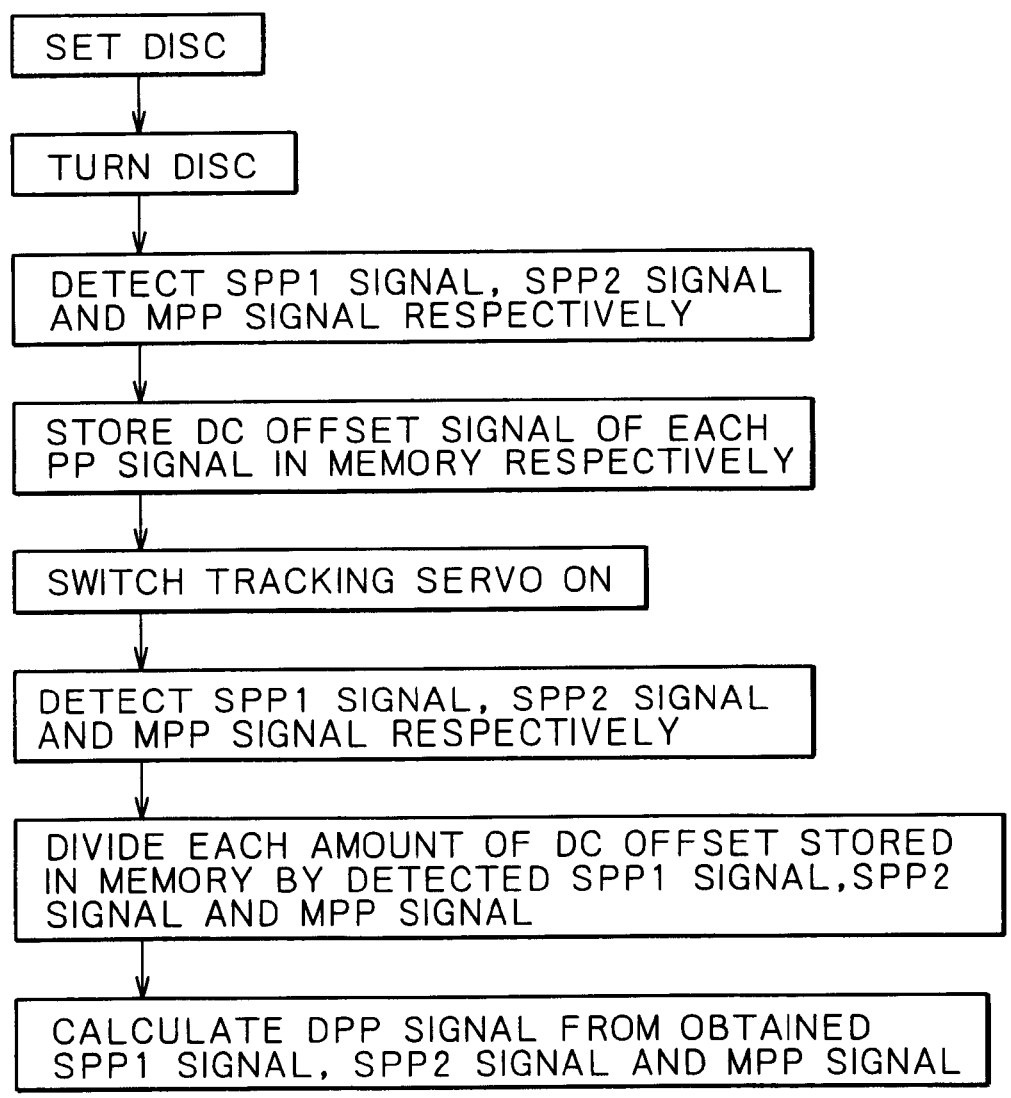
FIG. 10 is a flow chart showing a method of tracking servo according to the present invention.

In view of the above circumstances, the optical pickup device 1 according to the present invention is configured to cancel these amounts of DC offset every PP signal (the SPP1 signal, the SPP2 signal and the MPP signal) as follows, when DC offset is produced in the SPP1 signal, the SPP2 signal and the MPP signal even though the main spot is placed in the on-track state. A description will now be given of a tracking method in sequence with reference to a flow chart in FIG. 10.

1) Firstly, when the optical disc 6 is set for turning, the optical pickup device detects the SPP1 signal, the SPP2 signal and the MPP signal with the photo detectors 8a, 8b, 8b. In this state, tracking servo is not applied yet. Thus, when there are the variations in optical components and the positional difference of the objective 7 and the photo detector 8 or the like, the beam spots MS, SS, SS are presented on the photo detectors 8a, 8b, 8b as they are in the positional difference state.

2) Subsequently, the optical pickup device stores the amount of DC offset of each detected PP signal (the SPP1 signal, the SPP2 signal and the MPP signal) individually. The amount of DC offset of the SPP1 signal is stored if detected. The amount of DC offset of the SPP2 signal is stored if detected. Further, the amount of DC offset of the MPP signal is stored if detected.

3) Subsequently, the optical pickup device detects the SPP1 signal, the SPP2 signal and the MPP signal by switching on tracking servo and divides the preliminarily stored amount of DC offset of each PP signal (the SPP1 signal, the SPP2 signal and the MPP signal) by the SPP1 signal, the SPP2 signal and the MPP signal to cancel the amount of DC offset every PP signal (the SPP1 signal, the SPP2 signal and the MPP signal).

4) Then, calculation of a DPP signal from each adjusted PP signal (the SPP1 signal, the SPP2 signal and the MPP signal) according to the above operation expression is made, permitting generation of a DPP signal free from DC offset.

Accordingly, the application of tracking servo with the DPP signal generated in this manner as a tracking error signal permits writing of signals onto the optical disc 6 without detracking.

FIG. 11 illustrates the waveforms of the SPP1 signal, the SPP2 signal and the MPP signal in the initial stage when the spaces among the spots MS, SS, SS on the photo detector are different due to the variations in optical components, and the waveforms of the SPP1 signal, the SPP2 signal and the MPP signal after the amounts of DC offset produced in these PP signals have been canceled, together with the waveform of the DPP signal generated on the basis of each adjusted PP signal (the SPP1 signal, the SPP2 signal and the MPP signal).

Figure 12:
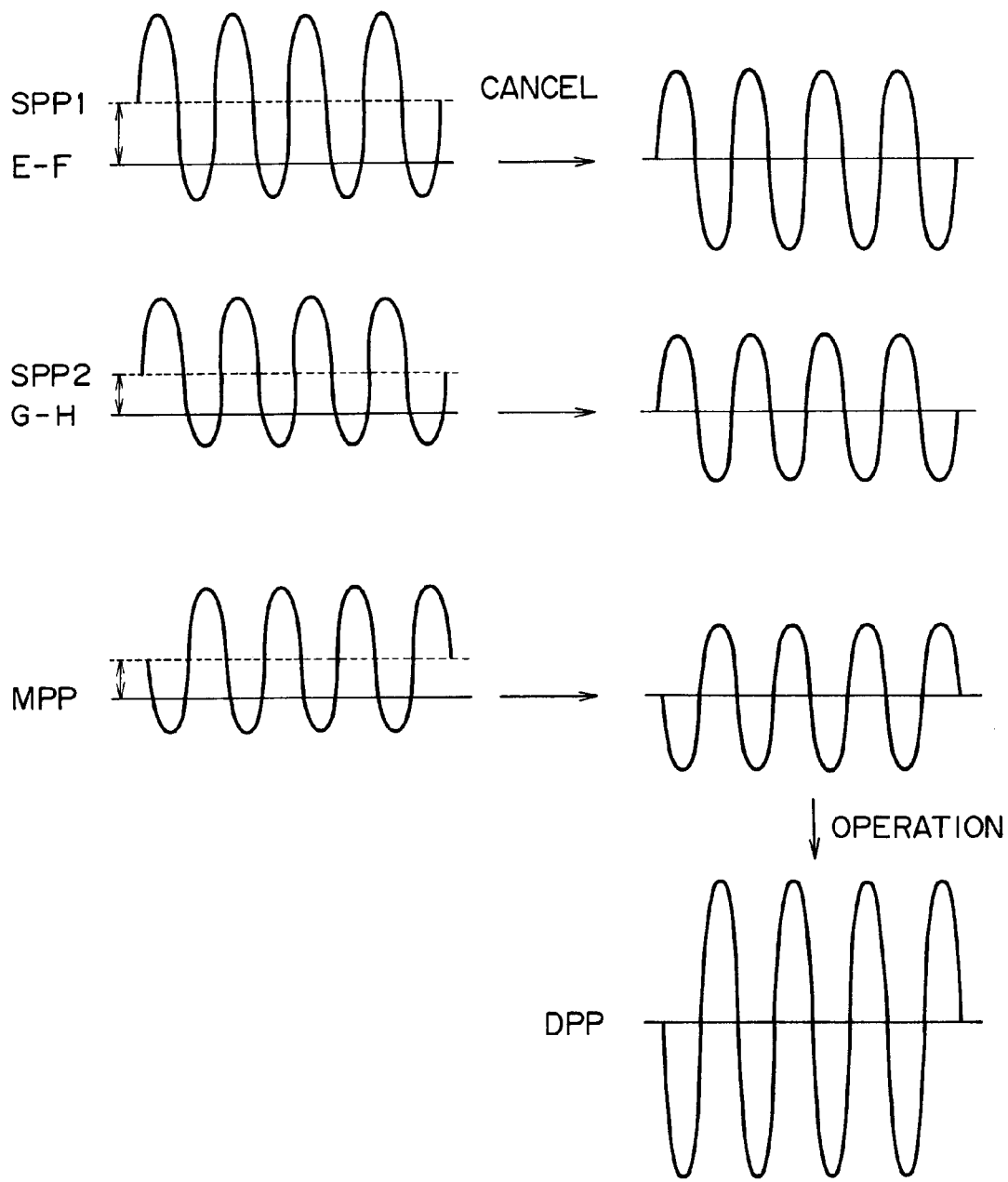
FIG. 12 illustrates waveforms of respective PP signal when the spots are one-sidedly shifted, together with waveforms of respective PP signal when the amount of DC offset of each PP signal is canceled.

FIG. 12 illustrates the waveforms of the SPP1 signal, the SPP2 signal and the MPP signal in the initial stage when the spots MS, SS, SS are one-sidedly shifted on the photo detector 8 due to the positional difference of the objective lens 7 and the photo detector 8 or the like, and the waveforms of the SPP1 signal, the SPP2 signal and the MPP signal after the amounts of DC offset produced in these PP signals have been canceled, together with the waveform of the DPP signal generated on the basis of each adjusted PP signal (the SPP1 signal, the SPP2 signal and the MPP signal).

Even when any of the variations in optical components and the positional difference of the objective lens 7 and the photo detector 8 or the like occurs, the amount of DC offset produced in writing may be canceled.

Then, the application of tracking servo with the adjusted tracking error signal generated in this manner permits writing of signals onto the optical disc 6 without detracking.

On the other hand, when radial skew (the inclination of an optical axis in the radial direction of the optical disc 6) is caused, detracking occurs under the influence of coma aberration of the objective lens. However, the present invention has also an effect on such detracking as a countermeasure.

Figure 1:
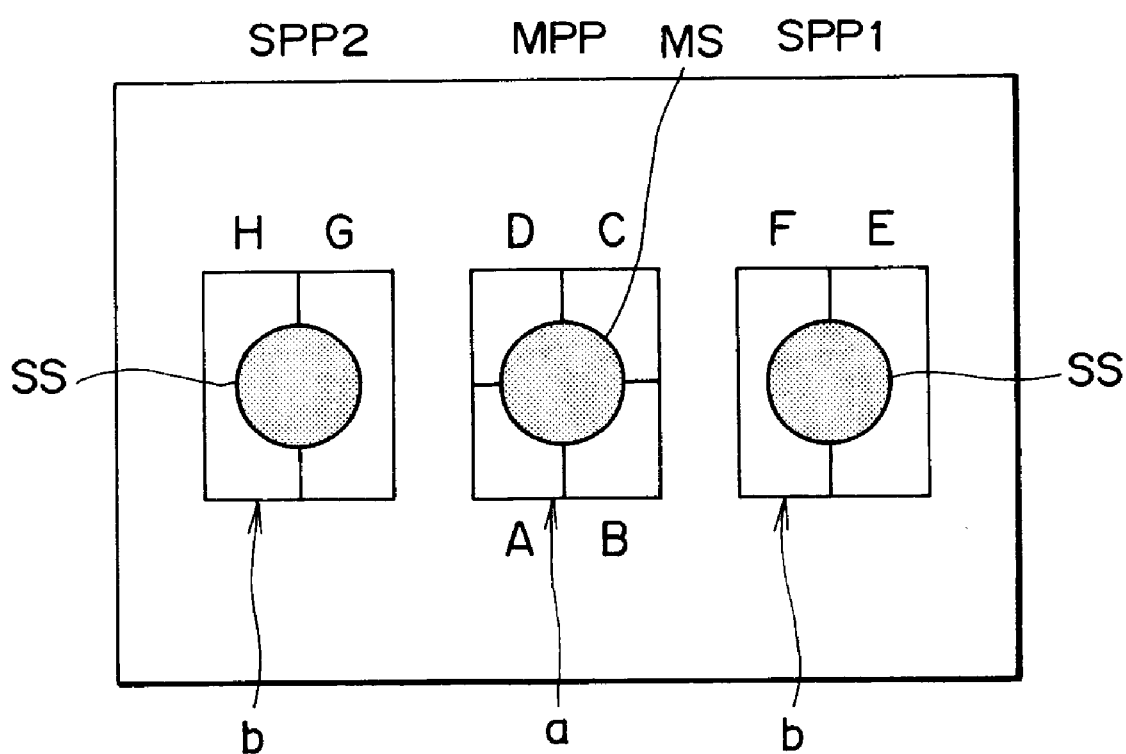
FIG. 1 is a view schematically showing the relation between photo detectors and spots when an objective lens and the photo detectors or the like are free from positional difference.
Figure 2:
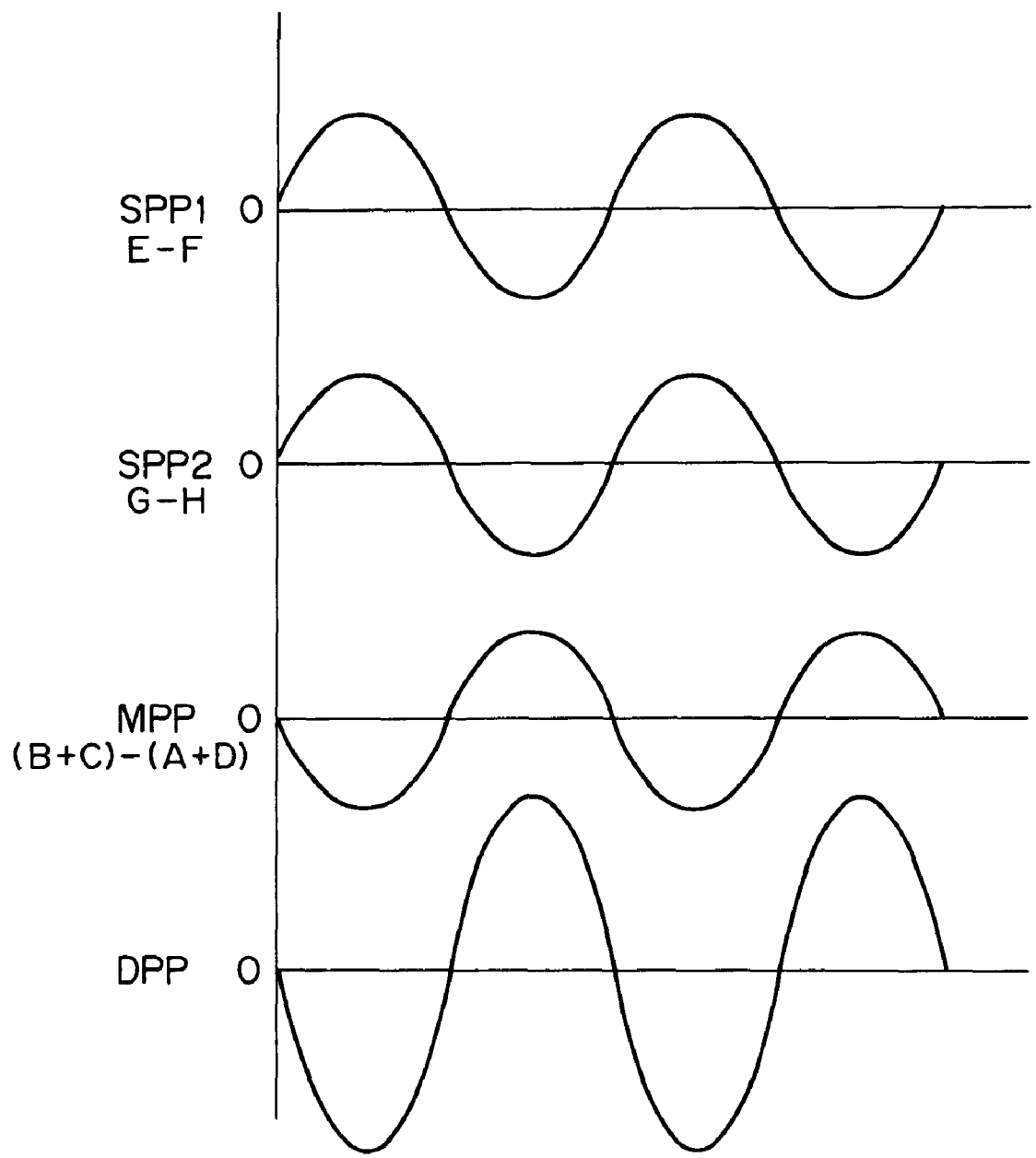
FIG. 2 is a waveform diagram of each PP signal in FIG. 1.
Figure 3:
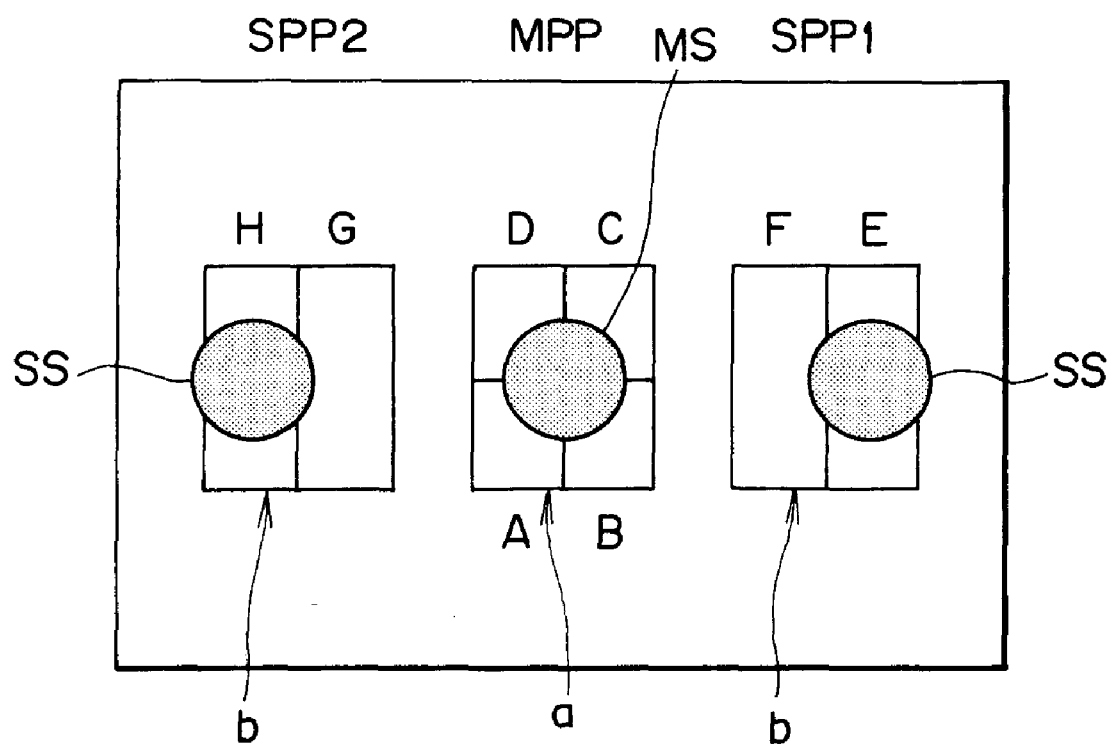
FIG. 3 is a view schematically showing the relation between the photo detectors and the spots when optical components or the like are subjected to variation.
Figure 4:
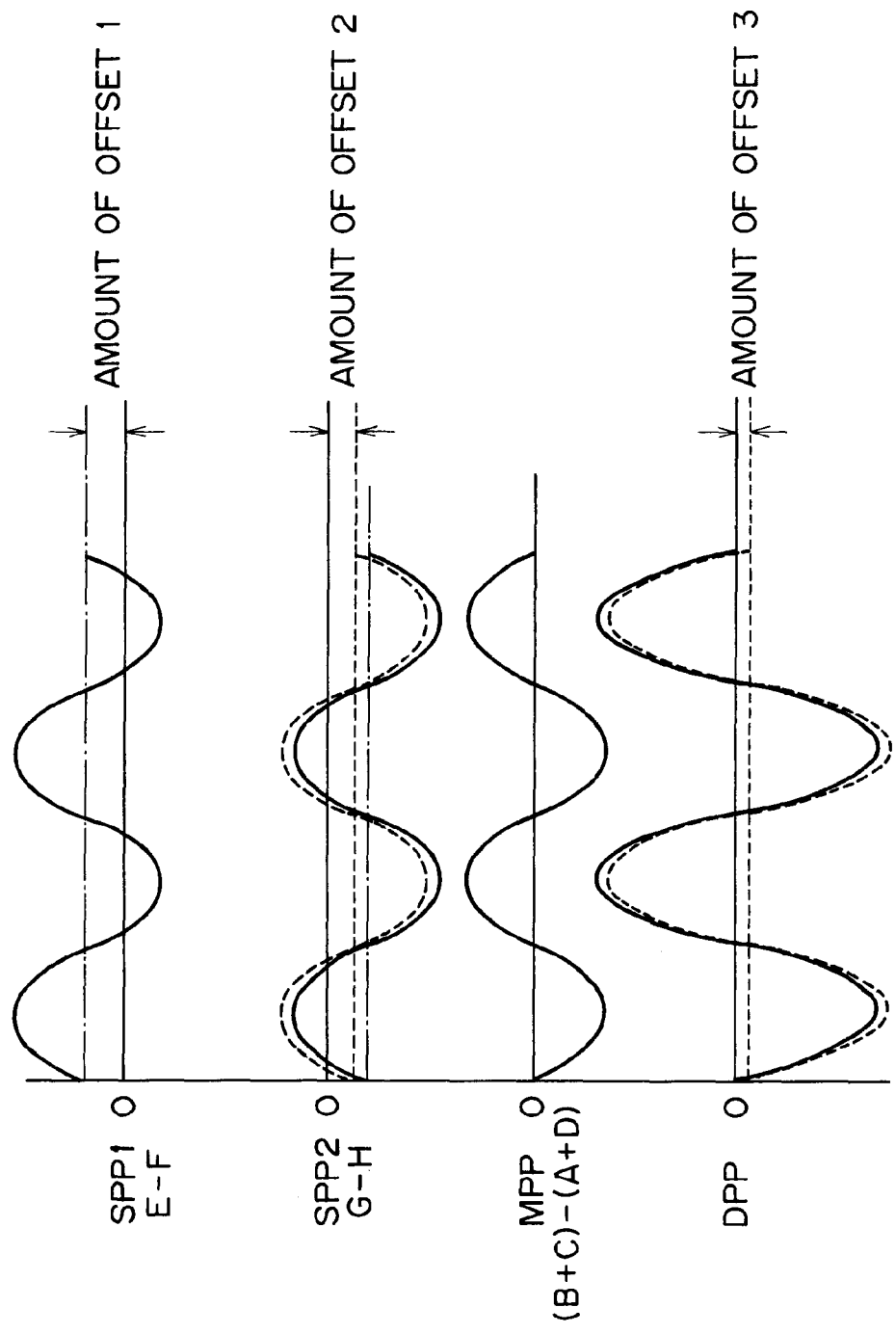
FIG. 4 is a waveform diagram of each PP signal in FIG. 3.
Figure 5:
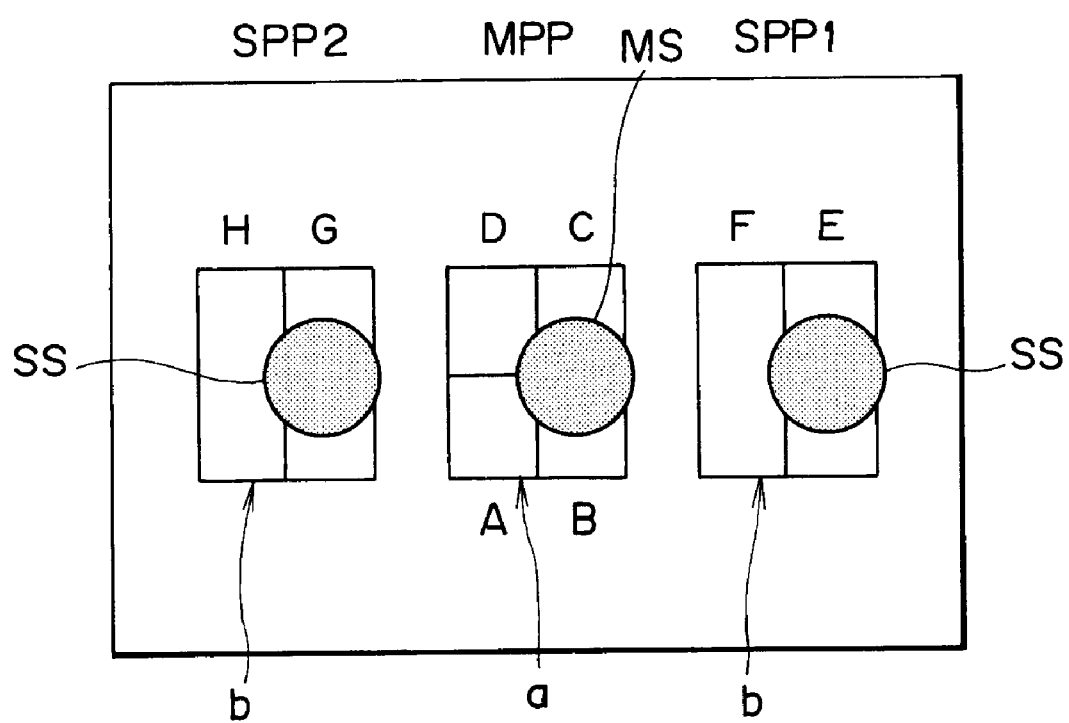
FIG. 5 is a view schematically showing the relation between the photo detectors and the spots when the objective lens and the photo detectors or the like are subjected to positional difference.
Figure 6:
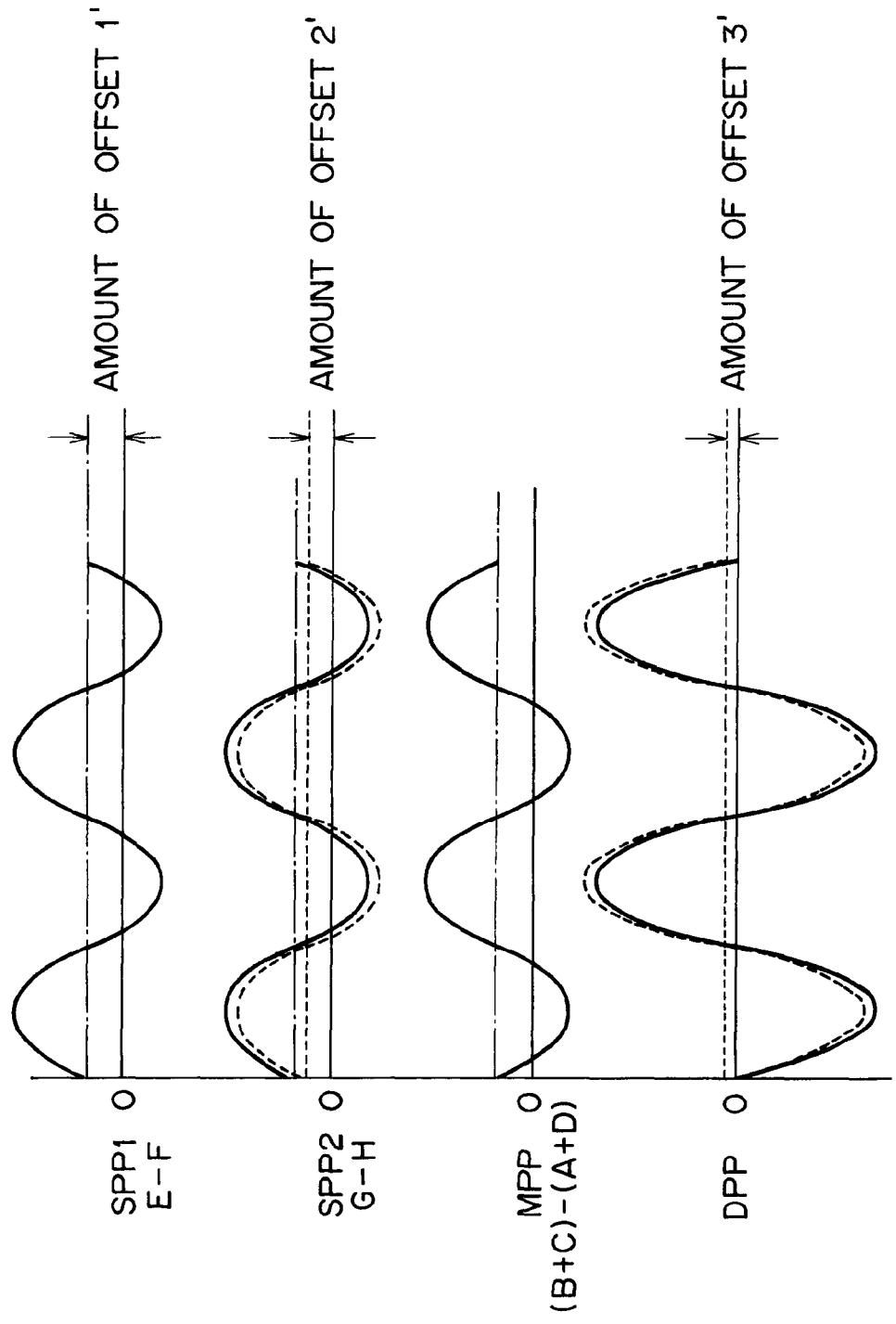
FIG. 6 is a waveform diagram of each PP signal in FIG. 5.
Figure 7:
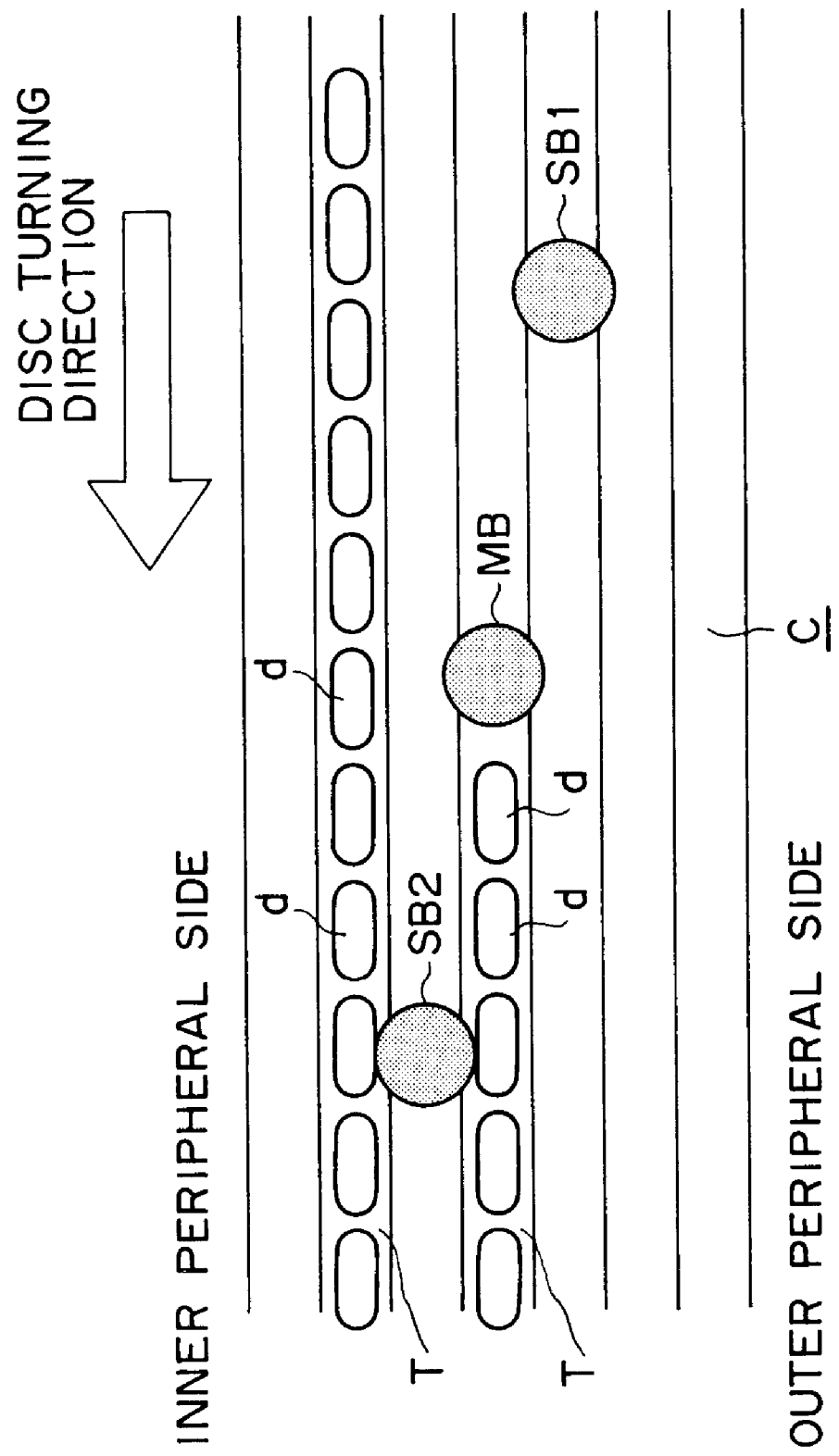
FIG. 7 is a view schematically showing an arrangement of spots on an optical disc in writing.

That is, when detracking by radial skew occurs, the spots MS, SS, SS are placed in relation to the photo detector 8 similarly to the positional relation between the spots MS, SS, SS and the photo detector 8 as shown in FIG. 5.

When any measure to counter skew is not taken, the amount of detracking is increased if a difference of detracking occurs in the same direction as detracking in writing operation, whereas the amount of detracking is canceled if a difference of detracking occurs in the reverse direction to detracking in writing operation. That is, there is a problem in that a difference between a skew position ensuring the most preferable reading performance and a skew position ensuring the most preferable writing performance is produced. However, since the application of the method of tracking servo according to the present invention eliminates the difference caused by the skew as described above, the skew position ensuring the most preferable reading performance may be matched with the skew position ensuring the most preferable writing performance.

Incidentally, although adjustment of such the SPP1 signal, the SPP2 signal and the MPP signal simultaneously with initialization of the optical pickup device 1 may eliminate the need for the subsequent adjustment of the amount of DC offset of each PP signal (the SPP1 signal, the SPP2 signal and MPP signal) relating to the optical pickup device 1, it is to be understood that the present invention is not limited to the above adjustment and also permits the above signals to be adjusted simultaneously with writing every optical disc, resulting in realization of more highly accurate tracking servo on an optical disc basis to meet a demand for higher recording density.

It is to be understood that the form and structure of each part in the foregoing description are merely one preferred embodiment of the present invention and that the technical scope of the present invention should not be limited thereto.

What is claimed is:

1. A method of tracking servo for an optical pickup device, which uses a diffraction means to divide a beam emitted from a laser light source into one main beam and two side beams, and allows a main photo detector to receive the main beam for reading or writing of signals and servo error detection, while allowing individual side photo detectors to receive two side beams for tracking error detection, comprising the steps of:

generating each individual push pull signal with a photo detector composed of said main photo detector having four light receiving sections crosswise and said side photo detectors respectively having two light receiving sections left and right; and generating a tracking error signal on the basis of operational output from the push pull signals resulting from respectively canceling amounts of DC offset produced in the each push pull signals in the respective photo detectors, wherein generating the tracking error signal includes storing DC offsets associated with each detected push pull signal when tracking servo is off, and dividing the stored DC offsets by additional push null signals of the main beam and two side beams, respectively, wherein said additional push pull signals are detected when tracking servo is on.

2. The method of claim 1, further comprising:

detracking the tracking error signal during a writing operation when radial skew occurs.

3. The method of claim 2, wherein detracking comprises:

increasing an amount of detracking when a difference of detracking occurs in the same direction as detracking in the writing operation.

4. The method of claim 2, wherein detracking comprises:

canceling an amount of detracking when a difference of detracking occurs in an opposite direction of detracking in the writing operation.

5. An optical pickup device, comprising:

means for generating individual push pull signals associated with a plurality of photo detectors, each photodetector composed of a main photo detector having four crosswise light receiving sections and two side photo detectors, respectively, said two side photo detectors having two left and right light receiving sections; and means for generating a tracking error signal based on an operational output from the push pull signals resulting from canceling an amount of DC offset produced by each push pull signal in the respective photo detectors, wherein means for generating the tracking error signal stores DC offsets associated with each detected push pull signal when tracking servo is off, and divides the stored DC offsets by additional push pull signals of the main beam and two side beams, respectively, and wherein said additional push pull signals are detected when tracking servo is on.

6. The optical device of claim 5, further comprising:

means for detracking the tracking error signal during a writing operation when radial skew occurs.

7. The optical device of claim 6, wherein means for detracking comprises:

means for increasing an amount of detracking when a difference of detracking occurs in the same direction of detracking in the writing operation.

8. The optical device of claim 6, wherein means for detracking comprises:

means for canceling an amount of detracking when a difference of detracking occurs in an opposite direction of detracking in the writing operation.

* * * * *

UNITED STATES PATENT AND TRADEMARK OFFICE
CERTIFICATE OF CORRECTION

PATENT NO. : 6,654,323 B2
DATED : November 26, 2003
INVENTOR(S) : Koji Takasaki

It is certified that error appears in the above-identified patent and that said Letters Patent is hereby corrected as shown below:

<u>Column 8,</u>
Line 3, replace "null" with -- pull --.

Signed and Sealed this

Twenty-fourth Day of February, 2004

JON W. DUDAS
*Acting Director of the United States Patent and Trademark Office*